United States Patent [19]

Heeks

[11] Patent Number: 5,493,376
[45] Date of Patent: Feb. 20, 1996

[54] THERMALLY STABILIZED POLYORGANOSILOXANE OIL

[75] Inventor: George J. Heeks, Rochester, N.Y.

[73] Assignee: Xerox Corporation, Stamford, Conn.

[21] Appl. No.: 166,848

[22] Filed: Dec. 15, 1993

[51] Int. Cl.⁶ .......................... G03G 15/20; G03G 21/00
[52] U.S. Cl. .......................................................... 355/284
[58] Field of Search ................................. 355/282, 284; 524/178, 267, 492, 714

[56] References Cited

U.S. PATENT DOCUMENTS

| | | | |
|---|---|---|---|
| 2,389,802 | 11/1975 | McGregor et al. | 260/607 |
| 2,389,804 | 11/1945 | McGregor et al. | 260/607 |
| 2,445,567 | 7/1948 | Elliott | 260/448.2 |
| 2,465,296 | 3/1949 | Swiss | 174/121 |
| 3,002,989 | 10/1961 | Awe et al. | 260/448.2 |
| 3,419,593 | 12/1968 | Willing | 260/448.2 |
| 4,216,252 | 8/1980 | Moeller | 427/387 |
| 4,409,356 | 10/1983 | Lagarde et al. | 524/492 |
| 4,704,425 | 11/1987 | Lagarde et al. | 524/492 |
| 4,719,275 | 1/1988 | Benditt et al. | 528/15 |
| 4,777,087 | 10/1988 | Heeks et al. | 428/321.1 |
| 4,925,895 | 5/1990 | Heeks et al. | 524/714 |
| 5,143,959 | 9/1992 | Carette et al. | 524/267 |
| 5,194,470 | 3/1993 | Carette et al. | 524/178 |

Primary Examiner—Fred L. Braun

[57] ABSTRACT

A thermally stabilized polyorganosiloxane oil including a polyorganosiloxane oil and as the thermal stabilizer the reaction product of chloroplatinic acid and a member selected from the group consisting of a cyclic polyorganosiloxane having the formula:

$$\left[ \begin{array}{c} R_3 \\ | \\ Si-O \\ | \\ R_4 \end{array} \right]_n$$

where $R_3$ is an alkyl radical having 1 to 6 carbon atoms and $R_4$ is selected from the group consisting of alkene and alkyne radicals having 2 to 8 carbon atoms and n is from 3 to 6; a linear polyorganosiloxane having the formula:

$$R_1 - \underset{\underset{CH_3}{|}}{\overset{\overset{R_2}{|}}{Si}} - O - \left[ \underset{\underset{CH_3}{|}}{\overset{\overset{CH_3}{|}}{Si}} - O \right]_m \underset{\underset{CH_3}{|}}{\overset{\overset{R_2}{|}}{Si}} - R_1$$

where $R_1$ and $R_2$ are selected from the group consisting of hydroxy and alkyl, alkoxy, alkene and alkyne radicals having 1 to 10 carbon atoms provided at least one of $R_1$ and $R_2$ is alkene or alkyne and m is from 0 to 50 and mixtures thereof present in an amount to provide at least 5 parts per million of platinum in said oil.

14 Claims, 7 Drawing Sheets

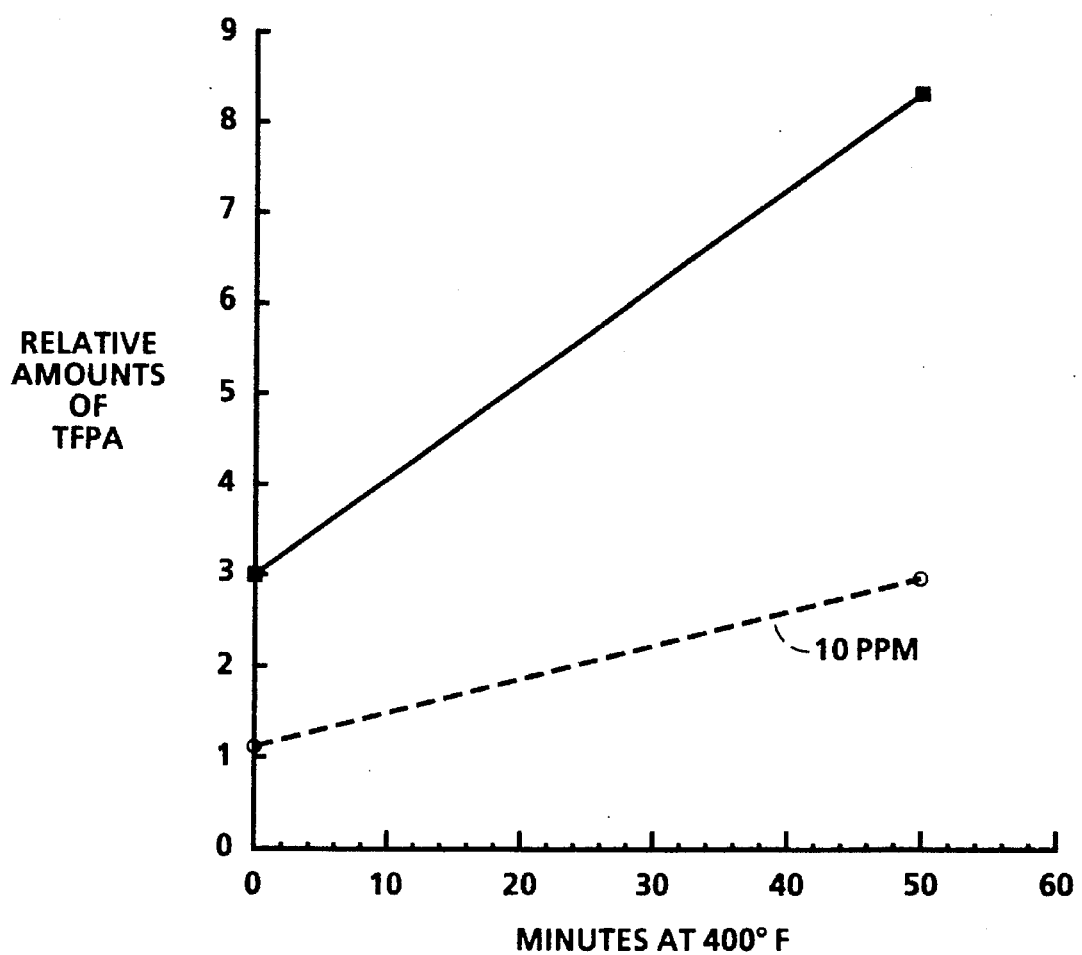

THERMALLY STABILIZED POLYORGANOSILOXANE OIL

BACKGROUND OF THE INVENTION

The present invention relates to a thermally stabilized polyorganosiloxane oil and in particular to a fusing system for fusing toner images in an electrostatographic printing apparatus which employs such an oil as a release agent.

In a typical electrostatographic reproducing apparatus, a light image of an original to be copied is recorded in the form an electrostatic latent image upon a photosensitive member and the latent image is subsequently rendered visible by the application of electroscopic thermoplastic resin particles which are commonly referred to as toner. The visible toner image is then in a loose powdered form and can be easily disturbed or destroyed. The toner image is usually fixed or fused upon a support which may be photosensitive member itself or other support sheet such as plain paper.

The use of thermal energy for fixing toner images onto a support member is well known. In order to fuse electroscopic toner material onto a support surface permanently by heat, it is necessary to elevate the temperature of the toner material to a point at which the constituents of the toner material coalesce and become tacky. This heating causes the toner to flow to some extent into the fibers or pores of the support member. Thereafter, as the toner material cools, solidification of the toner material causes the toner material to be firmly bonded to the support.

Typically, thermoplastic resin particles are fused to the substrate by heating to a temperature of between about 90° C. to about 160° C. or higher depending upon the softening range of the particular resin used in the toner. It is not desirable, however, to raise the temperature of the substrate substantially higher than about 200° C. because of the tendency of the substrate to discolor at such elevated temperatures particularly when the substrate is paper.

Several approaches to thermal fusing of electroscopic toner images have been described in the prior art. These methods include providing the application of heat and pressure substantially concurrently by various means: a roll pair maintained in pressure contact; a belt member in pressure contact with a roll; and the like. Heat may be applied by heating one or both of the rolls, plate members or belt members. The fusing of the toner particles takes place when the proper combination of heat, pressure and contact time are provided. The balancing of these parameters to bring about the fusing of the toner particles is well known in the art, and they can be adjusted to suit particular machines or process conditions.

During operation of a fusing system in which heat is applied to cause thermal fusing of the toner particles onto a support, both the toner image and the support are passed through a nip formed between the roll pair, or plate or belt members. The concurrent transfer of heat and the application of pressure in the nip effects the fusing of the toner image onto the support. It is important in the fusing process that no offset of the toner particles from the support to the fuser member takes place during normal operations. Toner particles offset onto the fuser member may subsequently transfer to other parts of the machine or onto the support in subsequent copying cycles, thus, increasing the background or interfering with the material being copied there. The so called "hot offset" occurs when the temperature of the toner is raised to a point where the toner particles liquefy and a splitting of the molten toner takes place during the fusing operation with a portion remaining on the fuser member. The hot offset temperature or degradation of the hot offset temperature is a measure of the release property of the fuser roll, and accordingly it is desired to provide a fusing surface which has a low surface energy to provide the necessary release. To ensure and maintain good release properties of the fuser roll, it has become customary to apply release agents to the fuser members to ensure that the toner is completely released from the fuser roll during the fusing operation. Typically, these materials are applied as thin films of, for example, silicone oils to prevent toner offset.

The silicone oils employed as release agents in these practices are typically polyorganosiloxanes, more specifically, polydimethylsiloxanes, which are used in a range of viscosities of from about 100 centistokes to 13,000 centistokes. While capable of performing satisfactorily these silicone oil release agents suffer from certain deficiencies. In particular, they tend to show an increase in viscosity and eventually gel when held at elevated temperatures with the consequence that the release agent management delivery system can be adversely affected. For example, the oil can gel while on the fuser roll or in the supply lines of the release agent management system. As previously discussed the typical fusing systems in electrostatographic printing apparatus have a heated fuser roll heated to temperatures of the order of 90° to 160° Centigrade and sometimes to temperatures approaching 200° Centigrade. An additional problem associated with these silicone oils at elevated temperatures is the generation of silicone oil vapor which is a detrimental by-product in that it tends to form insulating layers on the electrical circuits and contacts and may therefore interfere with the proper functioning of these circuits and contacts. Furthermore, depending on the chemical makeup of the silicone oils the vapors released at elevated temperatures may include environmentally undesirable materials such as benzene, formaldehyde, trifluoropropionaldehyde.

SUMMARY OF INVENTION

According to the present invention a thermally stabilized polyorganosiloxane oil is provided which has a dramatic increase in thermal stability at temperatures of up to 400° F. It is more resistant to increases in viscosity and gelation and weight loss at elevated temperatures.

In a further aspect of the present invention the polyorganosiloxane oil is a polydimethylsiloxane oil and in particular is a polydimethylsiloxane oil having the formula:

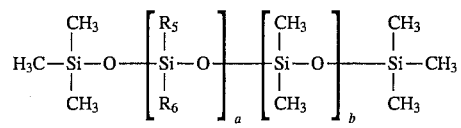

where $R_5$ and $R_6$ are selected from the group consisting of phenyl, unsubstituted and substituted alkyl radicals having 1 to 6 carbon atoms, said substituted alkyl radicals being selected from the group of fluoro substituted, amino substituted and mercapto substituted and a is 0 to 1000, b is 1 to 1000 and $50 \leq a+b \leq 1000$.

In a further aspect of the present invention the thermal stabilizer is the reaction product of chloroplatinic acid and a member selected from the group consisting of a cyclic polyorganosiloxane having the formula:

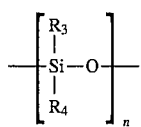

where $R_3$ is an alkyl radical having 1 to 6 carbon atoms and $R_4$ is selected from the group consisting of alkene and alkyne radicals having 2 to 8 carbon atoms and n is from 3 to 6 and a linear polyorganosiloxane having the formula:

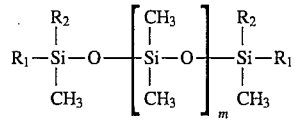

where $R_1$ and $R_2$ are selected from the group consisting of hydroxy and alkyl, alkoxy, alkene and alkyne radicals having 1 to 10 carbon atoms provided at least one of $R_1$ and $R_2$ is alkene or alkyne and m is from 0 to 50 and mixtures thereof present in an amount to provide at least 5 parts per million of platinum in the stabilized oil.

In a further aspect of the present invention the thermal stabilizer is the reaction product of 1,3,5,7 tetraethenyltetramethylcyclotetrasiloxane with chloroplatinic acid.

A further aspect of the present invention also relates to the use of the thermally stabilized oil in a fusing system for electrostatographic printing apparatus.

In a further aspect of the present invention the thermally stabilized oil has a viscosity of from about 50 centistokes to about 13,000 centistokes and a molecular weight of from about 3,600 to about 80,000.

BRIEF DESCRIPTION OF THE DRAWINGS

FIG. 6 is a graphical comparison of the generation of trifluoropropionaldehyde from trifluoropropyl silicone oil from nonstabilized oil and oil stabilized according to the practice of the present invention.

DESCRIPTION OF PREFERRED EMBODIMENT

Figure 1:
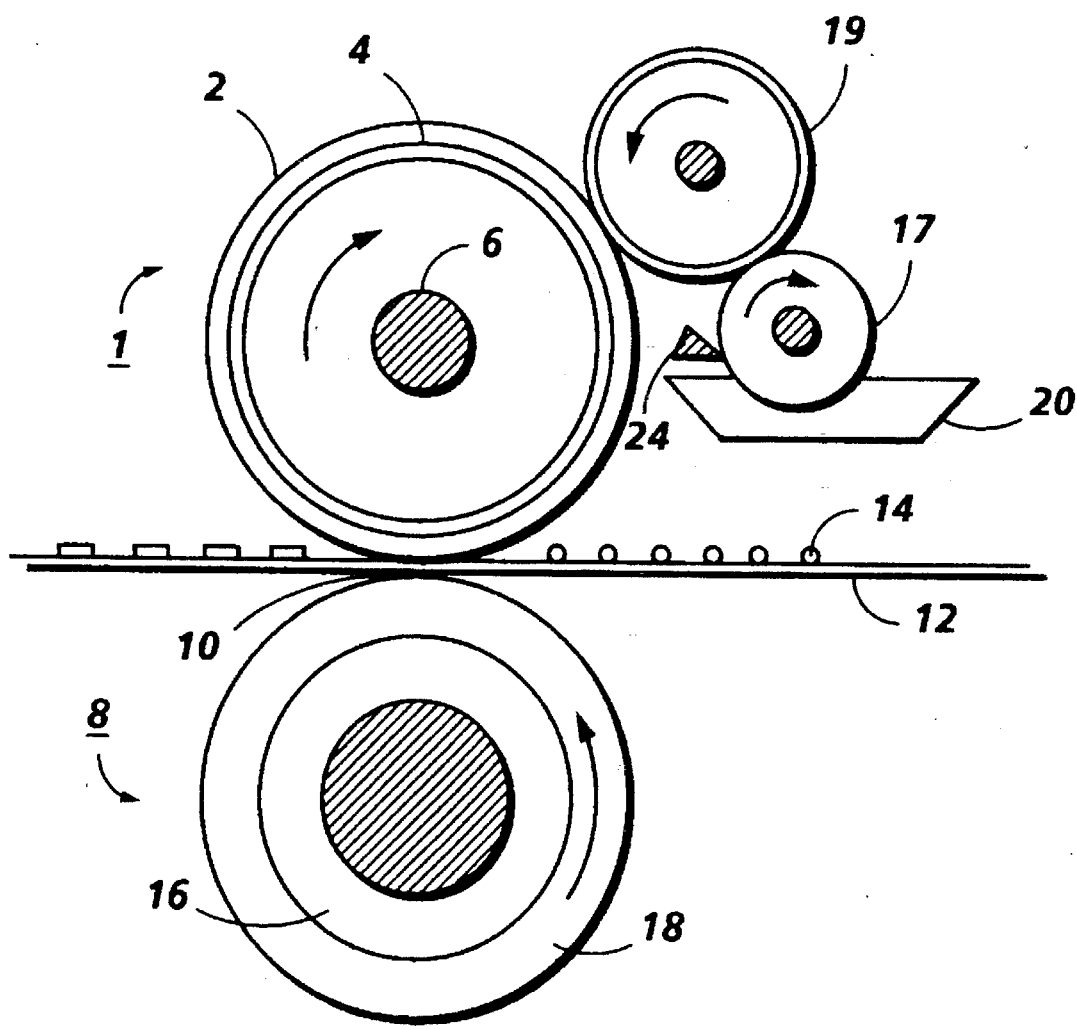
FIG. 1 is a schematic representation in cross section of an electrostatographic printing machine which may employ the fuser system and thermally stabilized polyorganosiloxane release agent according to the present invention.

A typical fusing system of the present invention is described in conjunction with a fuser assembly as shown in FIG. 1 where the numeral 1 designates a fuser roll comprising elastomer surface 2 upon suitable base member 4 which is a hollow cylinder or core fabricated from any suitable metal such as aluminum, anodized aluminum, steel, nickel, copper, and the like, having a suitable heating element 6 disposed in the hollow portion thereof which is coextensive with the cylinder. Backup or pressure roll 8 cooperates with fuser roll 1 to form a nip or contact arc 10 through which a copy paper or other substrate 12 passes such that toner images 14 thereon contact elastomer surface 2 of fuser roll 1. As shown in FIG. 1, the backup roll 8 has a rigid steel core 16 with a soft surface layer 18 thereon. Sump 20 contains polymeric release agent 22 which may be a solid or liquid at room temperature, but is a fluid at operating temperatures.

In the embodiment shown in FIG. 1 for applying the polymeric release agent 22 to elastomer surface 2, two release agent delivery rolls 17 and 19 rotatably mounted in the direction indicated are provided to transport release agent from the sump 20 to the elastomer surface. As illustrated in FIG. 1, roll 17 is partly immersed in the sump 20 and transports on its surface release agent from the sump to the delivery roll 19. By using a metering blade 24 a layer of polymeric release fluid can be applied initially to delivery roll 19 and subsequently to the elastomer fuser roll 2 in controlled thickness ranging from submicrometer thickness to thickness of several micrometers of release fluid. Thus, by metering device 24 about 0.1 to 2 micrometers or greater thickness of release fluid can be applied to the surface of elastomer 2.

As used herein, the term fuser member may be a roll, belt, flat surface or other suitable shape used in the fixing of thermoplastic toner images to a suitable substrate. It may take the form of a fuser member, a pressure member or a release agent donor member preferably in the form of a cylindrical roll. Typically, the fuser member is made of a hollow cylindrical metal core, such as copper, aluminum, steel and like, and has an outer layer of the selected cured fluoroelastomer. Alternatively, there may be one or more intermediate layers between the substrate and the outer layer of the cured elastomer if desired. Typical materials having the appropriate thermal and mechanical properties for such layers include silicone elastomers, fluoroelastomers, silicone grafted fluoroelastomers, EPDM and Teflon PFA sleeved rollers.

The polyorganosiloxane oils which are stabilized according to the practice of the present invention are typically polydimethylsiloxane oils represented by the formula:

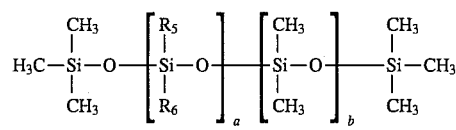

where $R_5$ and $R_6$ are selected from the group consisting of phenyl unsubstituted and substituted alkyl radicals having 1 to 6 carbon atoms, said substituted alkyl radicals being selected from the group of fluoro substituted, amino substituted and mercapto substituted and a is 0 to 1000, b is 1 to 1000 and $50 \leq a+b \leq 1000$. Typical specific materials include: Polydimethylsiloxane Fluids (e.g. Dow Corning 200 Fluid All Viscosities, e.g. 100 cs, 500 cs, 1000 cs, 13000 cs; Dow Corning Co. Midland Mich.) Dimethyldiphenyl Siloxane Copolymer, (PS 060.5 from Huls America Inc. Piscataway, N.J.) Polydimethyl[ 48–52% ] methylphenylsiloxane (PS063 from Huls America Inc. Piscataway, N.J.)

Polymethyl 3,3,3 trifluoropropylsiloxane (PS181, PS182, PS183 from Huls America Inc. Piscataway, N.J.)

The thermal stabilizer according to the present invention is the reaction product of chloroplatinic acid, $H_2PtCl_6$, with a cyclic or linear polyorganosiloxane or a mixture thereof. The cyclic polyorganosiloxanes have the formula:

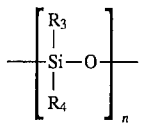

where $R_3$ is an alkyl radical having 1 to 6 carbon atoms and $R_4$ is selected from the group consisting of alkene and alkyne radicals having 2 to 8 carbon atoms and n is from 3 to 6. The linear polyorganosiloxanes capable of forming thermal stabilizers with chloroplatinic acid, are selected from those having the formula:

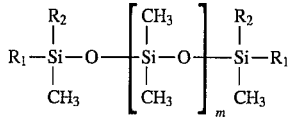

where $R_1$ and $R_2$ are selected from the group consisting of hydroxy and alkyl, alkoxy, alkene and alkyne radicals having 1 to 10 carbon atoms provided at least one of $R_1$ and $R_2$ is alkene or alkyne and m is from 0 to 50. The cyclic and linear polyorganosiloxanes may be used to form the reaction product separately or as a mixture thereof in an amount to provide at least 5 parts per million of platinum in the oil. The reaction product of the cyclic polyorganosiloxanes and linear polyorganosiloxanes with chloroplatinic acid may be formed by dissolving hydrogen hexchloride Plantinate IV in a suitable solvent and adding the solution to the unsaturated siloxanes for the complexing step. A complex can be prepared from the following ingredients.

(1) Hydrogen Hexachloride Platinate IV Hydrate, (38 to 48% Platinum) Aldrich#25402-9

(2) 1,3,5,7 Tetravinyltetramethylcyclotetrasiloxane, Huls #T2160

(3) Polyvinylmethylsiloxane, Huls # PS925

(4) 1-Butanol, VWR Scientific JT9054-1

A solution of the complex was prepared by using the following procedure.

(1) The vinyl solution was prepared by mixing 50.0 grams of the 1,3,5,7 Tetravinyltetramethylcyclotetrasiloxane, with 50.0 grams of the polyvinylmethylsiloxane.

(2) The hydrogen hexachloride plantinate IV solution was prepared by dissolving 0.345 grams of the hydrogen hexachloride platinate IV hydrate, in 10.8 of the 1-Butanol.

(3) The complex reaction product was prepared by gently pouring the platinate solution into the vinyl solution, and rinsing the platinate solution container with the vinyl solution to obtain a complete transfer. The complex solution contains about 0.0013 grams of Platinum per gram of solution, and is stored in an amber bottle, preferably under refrigeration. The technique for adding the complex reaction product to the siloxane is to add three grams of the complex reaction product to three hundred grams of the test PDMS, to obtain about 13 PPM platinum. The amount of the platinum reaction product that is added to the siloxane is dependent on the desired stabilization. Typically, between 5 and 15 PPM are added because that amount gives up to two times the life at 400° F., with no color or a very slight straw coloration to the polydimethylsiloxane fluid.

The following table gives the time to gelation of three nonfunctional 100 cs polydimethylsiloxane fluids oven aged at 400° F. Number one contained the PDMS fluid plus the equivalent amount of vinyl siloxanes that was used in sample number 2. Number 2 contained the complex reaction product containing platinum at about 13 PPM. Number 3 was the 100 cs PDMS without any additive.

| # | FLUID ID | TIME TO GELATION |
|---|----------|------------------|
| 1 | CONTROL PLUS VINYL ADDITIVE ONLY NO PLATINUM | ~14 DAYS |
| 2 | CONTROL WITH ADDED REACTION PRODUCT COMPLEX WITH PLATINUM | ~35 DAYS |
| 3 | CONTROL WITH NO ADDITIVE | ~14 DAYS |

Typical cyclic polyorganosiloxanes include alkenylcyclosiloxanes such as: $[CH_2=CH(CH_3)SiO]_3$, 1,3,5 Triethenyltrimethylcyclotrisiloxane; $[CH_2=CH(CH_3)SiO]_4$, 1,3,5,7 Tetraethenyltetramethylcyclotetrasiloxane; $[CH_2=CHCH_2(CH_3)SiO]_4$, 1,3,5,7 Tetrallyltetramethylcyclotetrasiloxane; $[CH_2=CH(CH_3)SiO]_6$, 1,3,5,7,9,11 Hexaethenylhexamethylcyclohexasiloxane. Typical commercially available cyclic polyorganosiloxanes include the platinum cyclovinylmethylsiloxane complex available from Huls America Inc., Piscataway, N.J. under the designation PC085.

Typical linear polyorganosiloxanes include materials such as: $(CH_2=CH)(CH_3)_2SiOSi(CH_3)_2(CH=CH_2)$, 1,3 Divinyltetramethyldisiloxane; $(CH_2=CHCH_2)_2(CH_3)SiOSi(CH_3)(CH_2CH=CH_2)_2$, 1,1,3,3 Tetraally 1, 3 dimethyldisiloxane; $(CH_2=CH)(CH_3)(HO)SiOSi(OH)(CH_3)(CH=CH_2)$, 1,3 Divinyl 1,3 dimethyl 1,3 dihydroxy disiloxane, $(CH_2=CH)(CH_3)_2SiO-(SiO(CH_3)_2)_nSi(CH3)_2(CH=CH_2)$Polydimethylsiloxane, vinyldimethyl terminated where n varies from 1 to 50.

In addition to the technique previously described for adding the reaction product to the polyorganosiloxane oil, there are at least two additional methods of adding the reaction product (2 to 3.5% Platinum) to the Polydimethylsiloxane when using the commercially available PC085. The first is to dilute one gram of the PC085 with the polydimethylsiloxane (PDMS) to be tested (about 1 gram PC085 in 59 grams test PDMS) to be tested and then add the required amount of the diluted complex, typically about nine grams, to the test polydimethylsiloxane, typically about 300 grams, to obtain the desired PPM of Platinum, usually about 15 PPM, (assuming 3% Platinum in the PC085). The alternative procedure is to determined the number of drops equal to one gram of the PC085, using a needle nose pipet, VWR # 14673-010, typically about 60 drops per gram, and then add the required number of drops, typically about 9, to the test polydimethylsiloxane, typically 300 grams, to obtain the desired PPM of Platinum, usually about 15 PPM.

The following examples further define and describe the thermally stabilized polyorganosiloxane oils according to the present invention. Unless indicated otherwise, all parts and percentages are by weight.

EXAMPLE I

Figure 2:
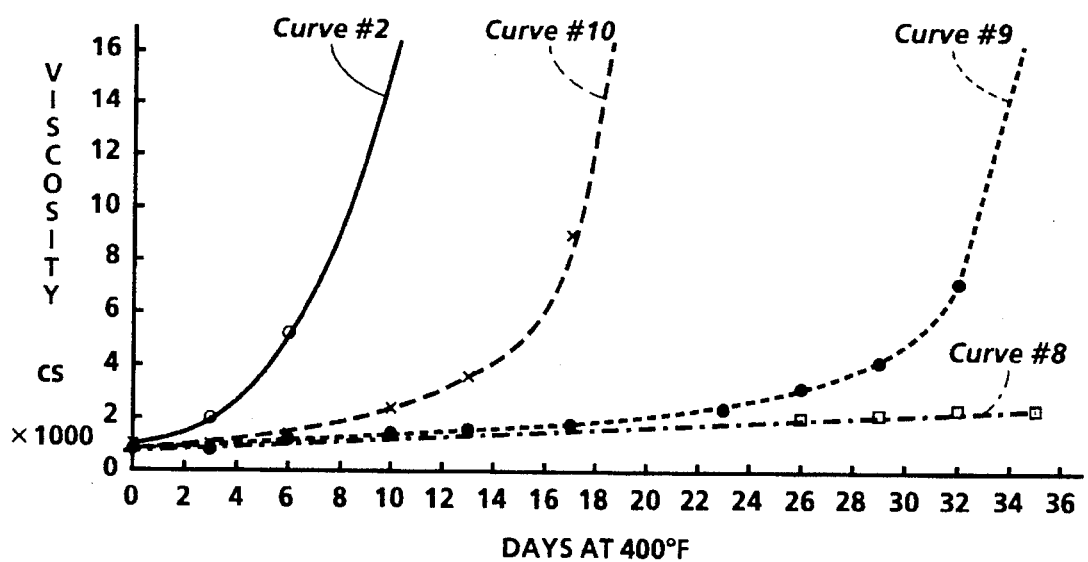
FIG. 2 is a graphical representation of the increase in viscosity over time at 400° F. of 1000 centistokes polydimethyl siloxane with varying amounts of a thermal stabilizer according to the present invention.

A nonfunctional polydimethylsiloxane oil having a viscosity of 1000 centistokes was evaluated as follows: The sample numbers and the parts per million of platinum in the reaction product according to the present invention as exemplified by Huls (Petrach PC085) were evaluated for viscosity modification at 400° F. as well as gelation as indicated in FIG. 2 by both the table below and graphs that are drawn.

| Curve A | PPM PLATINUM | TIME TO GELATION |
|---|---|---|
| 2 | NONE | ~10 to 13 |
| 10 | ~6 TO 7 | ~23 |
| 9 | ~13 to 14 | ~35 |
| 8 | ~26 | greater than 36 |

The test was suspended after 36 days. As may be observed, gelation occurred when no reaction product was present at 10 to 13 days and occurred at 35 days when approximately 13.0 parts per million of the reaction product was present.

As may also be observed, sample number 8, which contained substantially more amount of the reaction product according to to the present invention showed very little increase in viscosity and no gelation.

EXAMPLE II

Figure 3:
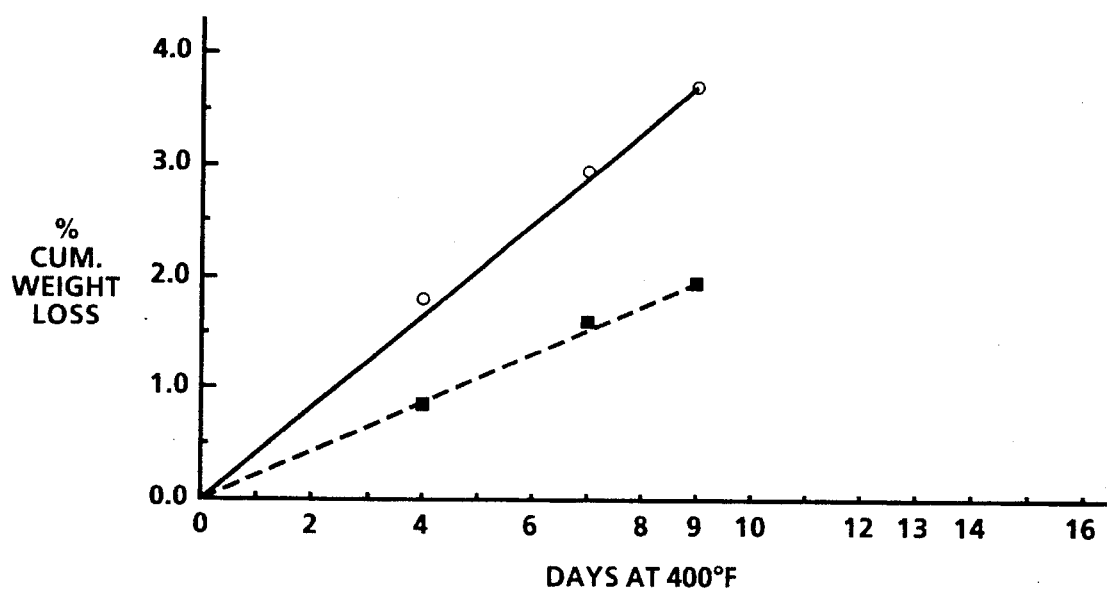
FIG. 3 shows the increase in cumulative weight loss over time, at 400° F. for a stabilized and unstabilized polymethyl 3,3,3 trifluoropropylsiloxane.

Example II is a measurement of the cumulative weight loss of 1000 cs polymethyl at 400° F. wherein there is a control (solid line) that had no reaction product according to the present invention and wherein samples were evaluated containing the reaction product (dashed line) of the present invention. As may be observed with reference to FIG. 3 the 1000 centistokes polymethyl 3,3,3 trifluoropropylsiloxane, the fluid containing the reaction product had a significantly smaller cumulative weight loss and therefore less loss by evaporation over the test period at 400° F.

EXAMPLE III

In Example III viscosity to gelation vs. time at 400° F. was evaluated for 100 centistokes, 1000 centistokes and 13,000 centistokes, polydimethylsiloxane oil. All these oils were evaluated with no stabilizer and stabilized with Huls Petrach PC085 in an amount to provide about 15 PPM platinum. The results are graphically illustrated in FIGS. 4A, 4B and 4C. As may be observed, the unstabilized oils (solid line) all gel within 384 hours while the stabilized oils (dashed line) had essentially no change in viscosity throughout the test period.

EXAMPLE IV

Figure 4A:
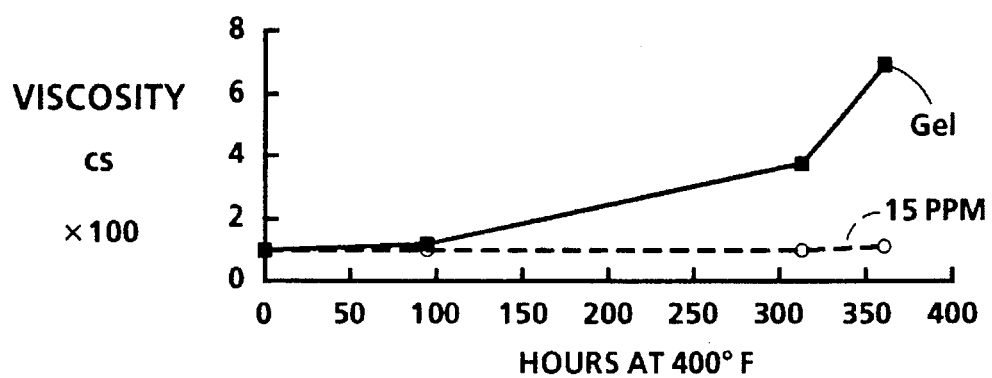
FIGS. 4A, 4B and 4C are graphical representations of viscosity in centistokes to gelation over time at 400° F. for stabilized and unstabilized 100, 1000 and 13,000 centistokes polydimethylsiloxane oil respectively.
Figure 4B:
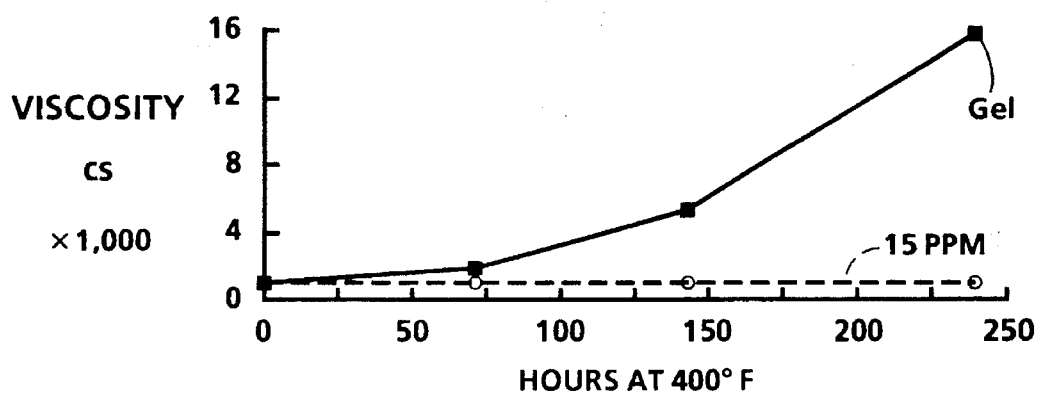
Figure 4C:
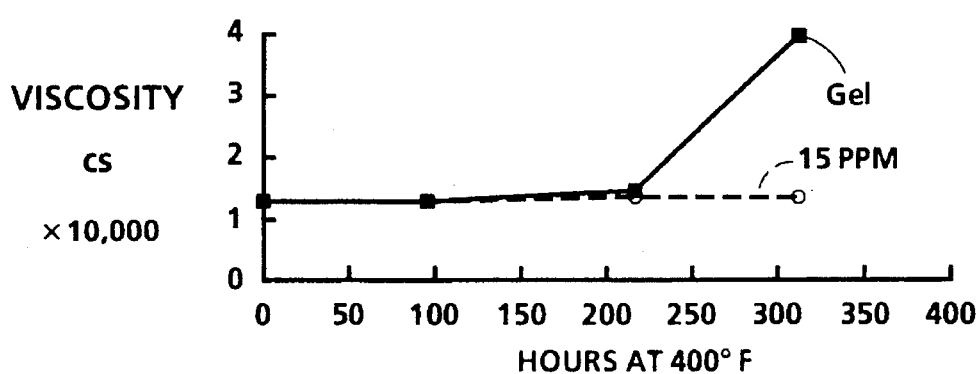
Figure 5A:
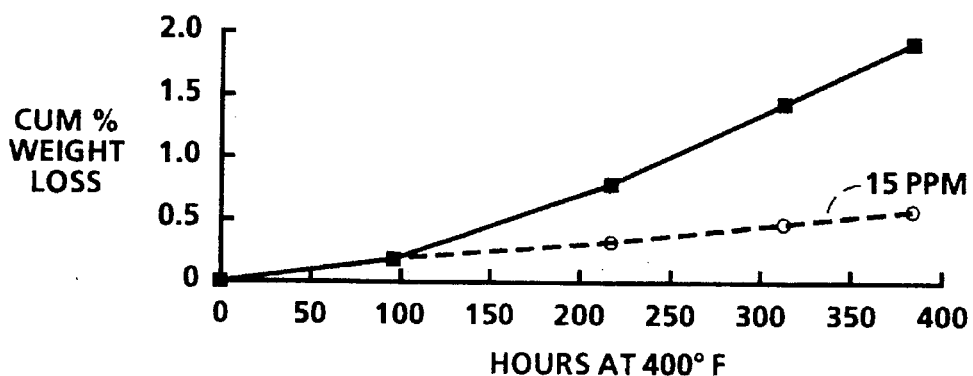
FIGS. 5A, 5B and 5C are graphical representations of cumulative weight loss over time at 400° F. for stabilized and unstabilized 100, 1000 and 10,000 centistokes polydimethylsiloxane oil respectively.
Figure 5B:
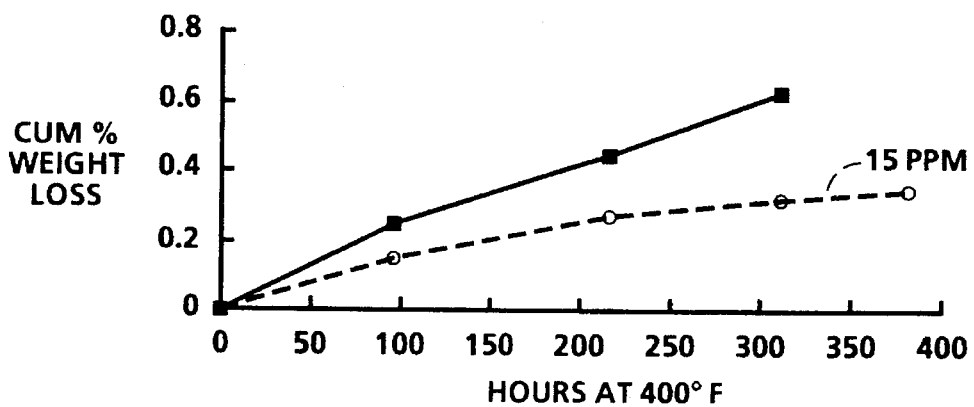
Figure 5C:
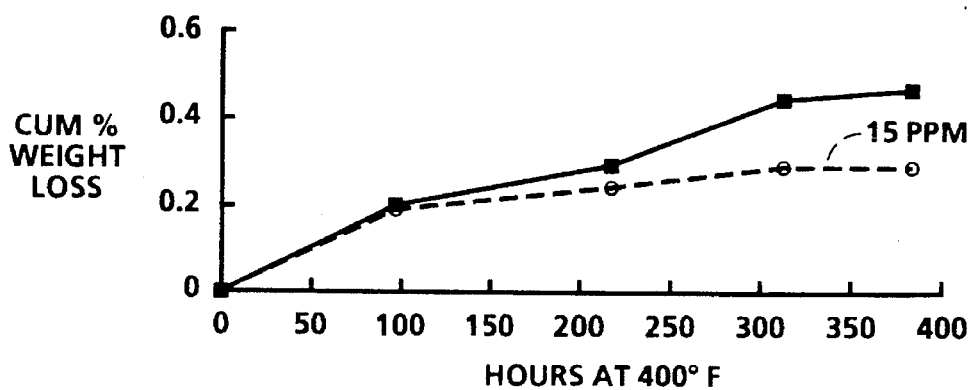
Figure 7:
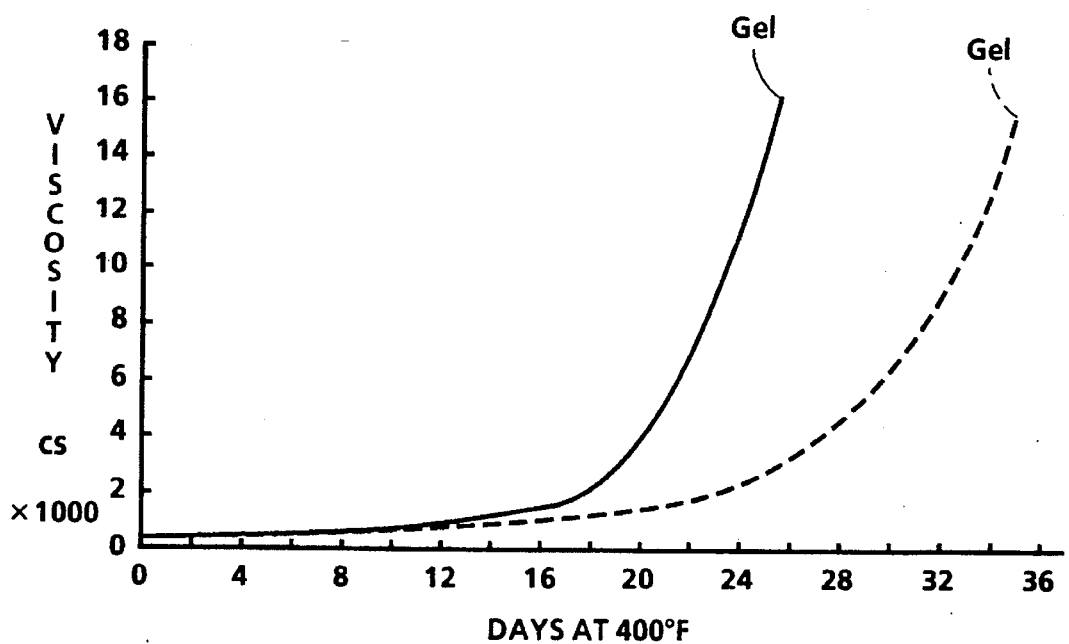
FIG. 7 is a graphical representation of the increase in viscosity over time at 400° F. for a stabilized and unstabilized mercapto polydimethyl siloxane. The solid line represents the oil unstabilized which gelled at 26 days and the dashed line represents the stabilized oil with 15 PPM platinum which gelled at 36 days.

Example IV is a similar evaluation of the same oils as in Example III and FIGS. 4A, 4B and 4C, comparing cumulative weight loss vs. time at at 400° F. over the same test period. Once again, the oils stabilized with a reaction product according to the present invention (dashed line) exhibited substantially lower cumulative weight loss. FIGS. 5A, 5B and 5C graphically illustrate this for 100 cs, 1000 cs and 13,000 cs oil respectively.

In addition, the presence of the reaction product, according to the present invention has been found to substantially reduce the emission of formaldehyde as an oxidative reaction product from the oil at elevated temperature as may be observed from the following table. The sample that was stabilized with the reaction product, PC085, contained about 13 PPM platinum, and both samples were pre-aged at 400° F. for five days prior to the formaldehyde analysis, in order to reflect the rapid viscosity change.

| Sample # | Material Test Time Temperature | Micrograms formaldehyde detected over 30 minutes | Micrograms formaldehyde detected over cumulative time |
|---|---|---|---|
| 9206766 | PDMS ALONE 30 MIN @ 400 F. | 16.400 µG/30 MIN | 16.400 CUM. µG (MICRO GRAM) |
| 9206767 | PDMS ALONE 60 MIN @ 400 F. | 15.800 µG/30 MIN | 32.200 CUM. µG |
| 9206768 | PDMS ALONE 90 MIN @ 400 F. | 17.500 µG/30 MIN | 49.700 CUM. µG |
| 9206769 | PDMS ALONE 120 MIN @ 400 F. | 16.000 µG/30 MIN | 65.700 CUM. µG |
| 9206770 | PDMS ALONE 150 MIN @ 400 F | 16.300 µG/30 MIN | 82.00 CUM. µG |
| 9206771 | PDMS ALONE 180 MIN @ 400 F. | 16.400 µG/30 MIN | 98.400 CUM. µG |
| 9206772 | PDMS ALONE 210 MIN @ 400 F. | 16.400 µG/30 MIN | 114.800 CUM. µG |
| 9206773 | PDMS + PC085 30 MIN @ 400 F. | <1.000 µG/30 MIN | <1.000 CUM. µG |
| 9206774 | PDMS + PC085 60 MIN @ 400 F. | <1.000 µG/30 MIN | <2.000 CUM. µG |
| 9206775 | PDMS + PC085 90 MIN @ 400 F. | <1.000 µG/30 MIN | <3.000 CUM. µG |
| 9206776 | PDMS + PC085 120 MIN @ 400 F. | <1.000 µG/30 MIN | <4.000 CUM. µG |
| 9206777 | PDMS + PC085 150 MIN @ 400 F. | <1.000 µG/30 MIN | <5.000 CUM. µG |
| 9206778 | PDMS + PC085 180 MIN @ 400 F. | <1.000 µG/30 MIN | <6.000 CUM. µG |
| 9206779 | PDMS + PC085 210 MIN @ 400 F. | <1.000 µG/30 MIN | <7.000 CUM. µG |

Furthermore, the presence of the reaction product according to the present invention has also been found to significantly reduce the generation of trifluoropropionaldehyde from trifluoropropyl silicone oil at elevated temperature as may be observed with reference to FIG. 6 where the solid line represents the oil without the reaction product and the dashed line represents the oil with 10 PPM of the reaction product.

It is not entirely clear what the reaction product between the cyclic and/or cyclic and/or linear polyorganosiloxane and the chloroplatinic acid is. It is likely that it exists, at least in part, as some type of coordination complex compound. It is also not entirely clear exactly how or why the reaction product thermally stabilizes the polyorganosiloxane oils. Indeed, the fact that it does provide this thermal stabilization at elevated temperature is quite unexpected since chloroplatinic acid and compounds formed with chloroplatinic acid are generally intended for use in addition curing of unsaturated siloxanes which typically are vinyl terminated and Si-H as the crosslinker is added across the double bond in a hydrosilation process. An experiment was conducted where increasing amounts of the reaction product appeared to have a nonhydrosilation cross linking effect. This prompted the belief that the addition of the reaction product might cause gelation of nonfunctional silicones. Initially, a few drops of PC085 were added (about 15 PPM) to a sample of 100 centistokes nonfunctional polydimethylsiloxane oil with the expectation that it would cause gelation quicker than a sample without the catalyst when they were heated to a temperature of about 400° F. In actuality, the opposite result occurred. After about 14 days the sample without the PC085 gelled and the sample with the PC085 remained fluid.

Furthermore, the use of this type of catalyst has been with siloxanes to produce hydrosilation which implies that you have crosslinkable functional groups which are not present in a typical oil. A published hydrosilation mechanism has the functional groups, $\equiv$Si —H and $\equiv$Si —CH= CH$_2$, associate or complex with the catalytic platinum ion during the cross linking step, and it is this association and the proximity of the reactants that enhances the hydrosilation process. While nonfunctional PDMS fluids have no functional groups designed for crosslinking, reactive free radicals are generated during air oxidation, usually from the methyl groups. Thus, a possible catalytic stabilization mechanism could be the association/complexing of these free radicals with the platinum, similar to the hydrosilation mechanism. This could enhance recombination of early stage species, which would slow or delay the propagation step. The platinum would act as a stabilization catalyst, and for a time, it would slow the fluid viscosity increase, reduce the generation of volatile reaction products and delay gelation. Regardless of the mechanism, according to the present invention, a thermally stabilized polyorganosiloxane oil has been provided. The Examples together with the graphical illustrations establish the rather significant improvement in viscosity increase and gelation as well as weight loss at elevated temperature for extended periods of time. As described immediately above this effect was totally unexpected. While the invention has been described with reference to a fusing system in an electrostatographic printing apparatus it will be understood that it has applications in other applications wherein silicone oils are used at elevated temperatures such as in heating baths, transmission oils and transmission fluids where a viscosity increase can be a detriment.

All the patents and applications referred to herein are hereby specifically and totally incorporated herein by reference in their entirety in the instant specification.

While the invention has been described in detail with reference to specific and preferred embodiments it will be appreciated that various modifications and variation will be apparent to the artisan. Accordingly, all such modifications and embodiments as may readily occur to one skilled in the art are intended to be within the scope of the appended claims.

What is claimed is:

1. A thermally stabilized polyorganosiloxane oil comprising a polyorganosiloxane oil and as the thermal stabilizer the reaction product of chloroplatinic acid and a member selected from the group consisting of a cyclic polyorganosiloxane having the formula:

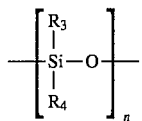

where R$_3$ is an alkyl radical having 1 to 6 carbon atoms and R$_4$ is selected from the group consisting of alkene and alkyne radicals having 2 to 8 carbon atoms and n is from 3 to 6; a linear polyorganosiloxane having the formula:

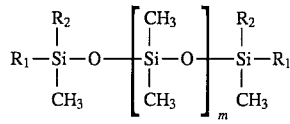

where R$_1$ and R$_2$ are selected from the group consisting of hydroxy and alkyl, alkoxy, alkene and alkyne radicals having 1 to 10 carbon atoms provided at least one of R$_1$ and R$_2$ is alkene or alkyne and m is from 0 to 50 and mixtures thereof present in an amount to provide at least 5 parts per million of platinum in said oil.

2. The thermally stabilized oil of claim 1 wherein said polyorganosiloxane oil is a polydimethylsiloxane oil.

3. The thermally stabilized oil of claim 2 wherein said oil is a polydimethylsiloxane oil having the formula:

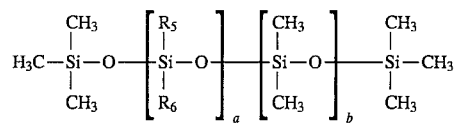

where R$_5$ and R$_6$ are selected from the group consisting of phenyl, unsubstituted and substituted alkyl radicals having 1 to 6 carbon atoms, said substituted alkyl radicals being selected from the group of fluoro substituted, amino substituted and mercapto substituted and a is 0 to 1000, b is 1 to 1000 and 50$\leq$a+ b$\leq$1000.

4. A thermally stabilized polyorganosiloxane oil in accordance with claim 3 wherein said thermal stabilizer is comprised of the reaction product of chloroplatinic acid and 1, 3, 5, 7 tetraethenyltetramethylcyclotetrasiloxane.

5. The thermally stabilized oil of claim 1 wherein said reaction product is that of 1,3,5,7 Tetraethenyltetramethylcyclotetrasiloxane with chloroplatinic acid.

6. The thermally stabilized oil of claim 1 wherein the oil has a viscosity of from about 50 centistokes to about 13,000 centistokes.

7. The thermally stabilized oil of claim 6 wherein said oil has a molecular weight of from about 3,600 to about 80,000.

8. A thermally stabilized polyorganosiloxane oil in accordance with claim 1 wherein said thermal stabilizer is comprised of the reaction product of chloroplatinic acid and 1, 3, 5, 7 tetraethenyltetramethylcyclotetrasiloxane.

9. A fusing system for an electrostatographic printing machine comprising a heated fuser member and a pressure member forming a fusing nip there between, a supply of release agent and means to deliver a release agent to the surface of the fuser member, said release agent comprising a polyorganosiloxane oil and as the thermal stabilizer the reaction product of chloroplatinic acid and a member selected from the group consisting of a cyclic polyorganosiloxane having the formula:

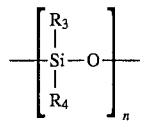

where R$_3$ is an alkyl radical having 1 to 6 carbon atoms and R$_4$ is selected from the group consisting of alkene and alkyne radicals having 2 to 8 carbon atoms and n is from 3 to 6; a linear polyorganosiloxane having the formula:

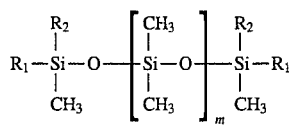

where $R_1$ and $R_2$ are selected from the group consisting of hydroxy and alkyl, alkoxy, alkene and alkyne radicals having 1 to 10 carbon atoms provided at least one of $R_1$ and $R_2$ is alkene or alkyne and m is from 0 to 50 and mixtures thereof present in an amount to provide at least 5 parts per million of platinum in said oil.

10. The fusing system of claim 9 wherein said polyorganosiloxane oil is a polydimethylsiloxane oil.

11. The fusing system of claim 9 wherein said polyorganosiloxane oil is of the formula:

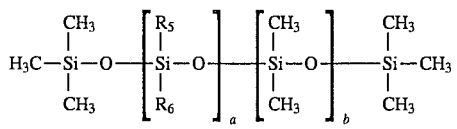

where $R_5$ and $R_6$ are selected from the group consisting of phenyl unsubstituted and substituted alkyl radicals having 1 to 6 carbon atoms, said substituted alkyl radicals being selected from the group of fluoro substituted, amino substituted and mercapto substituted and a is 0 to 1000, b is 1 to 1000 and $50 \leq a+b \leq 1000$.

12. The fusing system of claim 9 wherein said heated fuser member is an internally heated roll said pressure member is a roll and said means to deliver a release agent is a release agent donor roll.

13. The fusing system of claim 9 wherein the oil has a viscosity of from about 50 centistokes to about 13,000 centistokes.

14. The fusing system of claim 13 wherein the thermally stabilized oil has a molecular weight of from about 3,600 to about 80,000.

* * * * *